US012557909B1

(12) United States Patent
Bantle

(10) Patent No.: US 12,557,909 B1
(45) Date of Patent: Feb. 24, 2026

(54) MOTION ARRANGEMENT

(71) Applicant: Titus d.o.o. Dekani, Dekani (SI)

(72) Inventor: Ulrich Bantle, Mannheim (DE)

(73) Assignee: Titus d.o.o. Dekani, Dekani (SI)

( * ) Notice: Subject to any disclaimer, the term of this patent is extended or adjusted under 35 U.S.C. 154(b) by 240 days.

(21) Appl. No.: 18/281,598

(22) PCT Filed: Feb. 17, 2022

(86) PCT No.: PCT/EP2022/053883
§ 371 (c)(1),
(2) Date: Sep. 12, 2023

(87) PCT Pub. No.: WO2022/194478
PCT Pub. Date: Sep. 22, 2022

(30) Foreign Application Priority Data

Mar. 16, 2021 (DE) ..................... 10 2021 106 384.1

(51) Int. Cl.
*A47B 88/463* (2017.01)
*E05F 1/10* (2006.01)
*E05F 1/16* (2006.01)

(52) U.S. Cl.
CPC .............. *A47B 88/463* (2017.01); *E05F 1/10* (2013.01); *E05F 1/16* (2013.01)

(58) Field of Classification Search
CPC ............. A47B 88/463; E05F 1/10; E05F 1/16
See application file for complete search history.

(56) References Cited

U.S. PATENT DOCUMENTS 3,674,329 A 7/1972 Schill
7,281,773 B2 * 10/2007 Sato ....................... A47B 88/47 312/333

(Continued)

FOREIGN PATENT DOCUMENTS

AU 2019229400 A1 * 4/2020 ............. E05F 5/027
DE 102009021202 A1 2/2011

(Continued)

OTHER PUBLICATIONS

International Search Report for corresponding patent application No. PCT/EP2022/053883, dated Jul. 21, 2022, 18 pages (not prior art).

(Continued)

*Primary Examiner* — Hanh V Tran
(74) *Attorney, Agent, or Firm* — Lucian Wayne Beavers; Patterson Intellectual Property Law, PC

(57) ABSTRACT

The invention relates to a motion arrangement (10), in particular for a drawer, a sliding door, a hinged door, a flap or similar movable furniture part, having a push-out arrangement, wherein the push-out arrangement comprises a guide element (40), on which an energy accumulator (90) acts and which is guided on or in a fitting part, in particular on or in a housing (30), wherein the energy accumulator (90) can be used to displace the guide element (40) from a park position into an ejecting position, and wherein the guide element (40) entrains a slider (70) from the park position into the ejecting position at least along part of its travel path. To be able to individualize such a motion arrangement (10) in a simple manner with regard to its ejection path, according to the invention provision is made for the guide element (40) to be connected to the slider (70) in the park position directly or via at least one adapter (77) by means of a detachable connection.

18 Claims, 9 Drawing Sheets

(56) References Cited

U.S. PATENT DOCUMENTS

Figure 1:
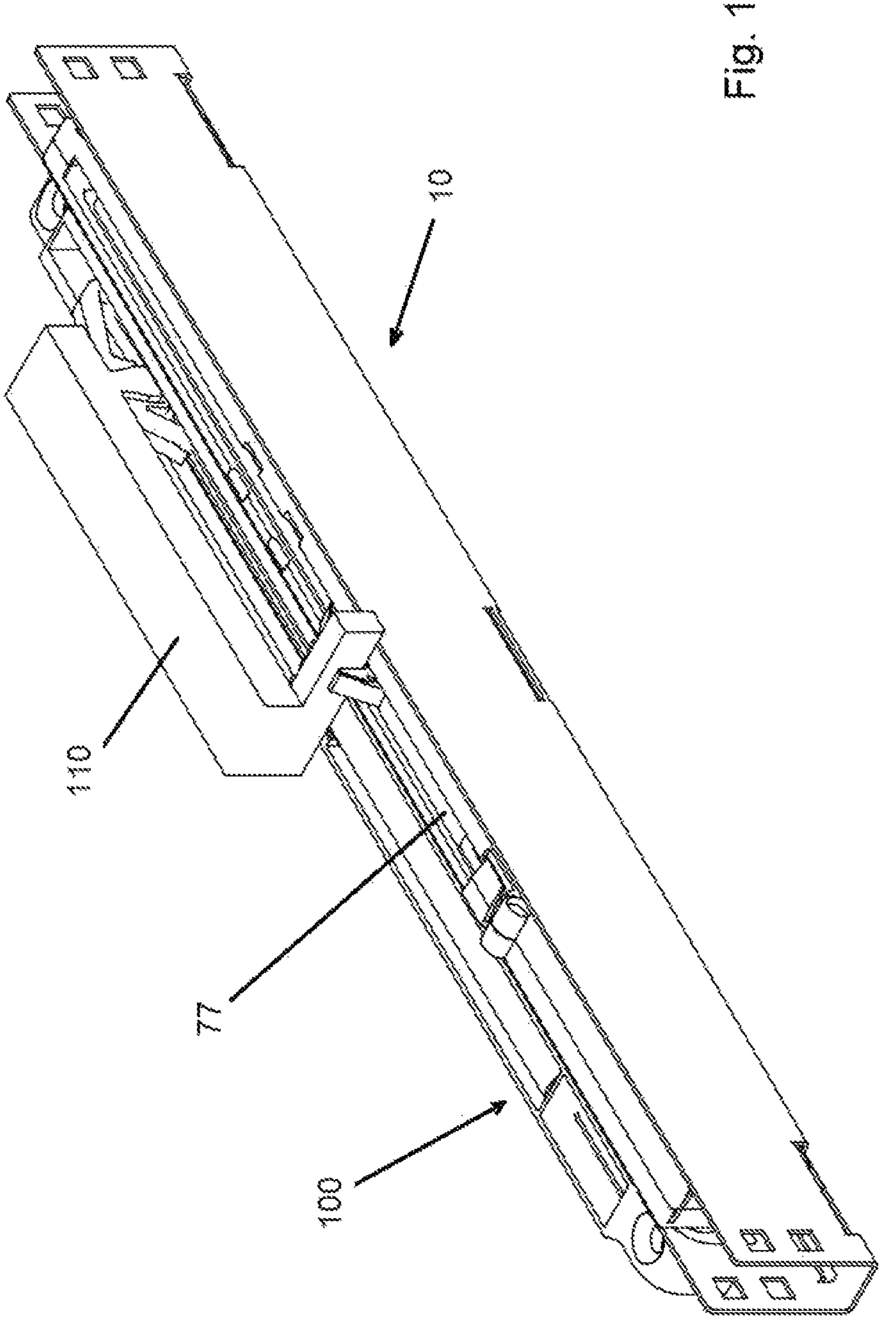

| | | | | |
|---|---|---|---|---|
| 7,481,505 | B2 * | 1/2009 | Orita | A47B 88/467 312/333 |
| 9,215,929 | B2 * | 12/2015 | Brunnmayr | A47B 88/47 |
| 9,532,648 | B2 * | 1/2017 | Gasser | A47B 88/437 |
| 9,642,461 | B2 * | 5/2017 | Goetz | A47B 88/463 |
| 10,051,962 | B2 * | 8/2018 | Goetz | A47B 88/57 |
| 10,172,461 | B2 * | 1/2019 | Fischer | A47B 88/497 |
| 10,188,208 | B2 * | 1/2019 | Goetz | A47B 88/463 |
| 10,405,653 | B2 * | 9/2019 | Goetz | A47B 88/463 |
| 10,575,637 | B2 * | 3/2020 | Wohlgenannt | A47B 88/463 |
| 11,459,811 | B2 | 10/2022 | Bantle | |
| 11,585,593 | B2 * | 2/2023 | Eom | A47B 88/467 |
| 2017/0020285 | A1 | 1/2017 | Schallert et al. | |
| 2019/0021494 | A1 * | 1/2019 | Bantle | A47B 88/47 |
| 2020/0205566 | A1 * | 7/2020 | Wohlgenannt | A47B 88/463 |
| 2020/0337456 | A1 * | 10/2020 | Chen | A47B 88/477 |
| 2021/0000255 | A1 * | 1/2021 | Chen | A47B 88/463 |

FOREIGN PATENT DOCUMENTS

| | | | | |
|---|---|---|---|---|
| DE | 102015117004 | B3 * | 3/2017 | A47B 88/47 |
| DE | 102017121701 | A1 * | 3/2019 | A47B 88/463 |
| EP | 3062661 | B1 * | 11/2021 | A47B 88/463 |
| WO | WO-2015096890 | A1 * | 7/2015 | A47B 88/463 |
| WO | WO-2018185311 | A1 * | 10/2018 | A47B 88/463 |

OTHER PUBLICATIONS

Office Action for corresponding patent application No. DE 10 2021 106 384.1, dated Oct. 29, 2022, 5 pages (not prior art).

* cited by examiner

MOTION ARRANGEMENT

The invention relates to a motion arrangement, in particular for a drawer, a sliding door, a hinged door, a flap or similar movable furniture part, having an push-out arrangement, wherein the push-out arrangement comprises a guide element, on which an energy accumulator acts and which is guided on or in a fitting part, in particular on or in a housing, wherein the energy accumulator can be used to move the guide element from a park position into an ejection position, and wherein the guide element entrains a slider at least along part of its travel path from the park position to the ejection position.

Motion arrangements according to the invention may be such that they combine a push-out arrangement with a retractor device. To this end, the retractor device is used to move a furniture part, for instance a drawer, from an open position to a closed position. During this operation, a spring accumulator of the retractor device discharges to move the furniture part. The push-out arrangement is used to move the furniture part from a closed position to an open position. Such motion arrangements significantly increase the ease of use of furniture.

Such a motion arrangement is known from WO 2018/185311. This known motion arrangement can be used to move furniture parts from the closed position to the open position via an opening region.

Different furniture manufacturers have different demands on a motion arrangement. For instance, one furniture manufacturer may require a motion arrangement that provides the longest possible ejection path for the furniture part. Another furniture manufacturer, on the other hand, may want a less lengthy ejection path. Ultimately, the requirements for a motion arrangement are dictated by the design of the particular piece of furniture to be moved. This makes it necessary to provide different motion arrangements to fulfill these requirements.

The invention addresses the problem of providing motion arrangements of the type mentioned above, which can significantly reduce the number of parts and assembly effort of furniture making.

This problem is solved in that the guide element is connected to the slider in the park position directly or via at least one adapter by means of a detachable connection.

The adapter can be used to adapt the kinematics of the motion arrangement to the individual application. For instance, it is possible to use the adapter to change the spatial allocation of the slider to the guide element. It is conceivable that when the adapter is installed, the slider is spaced further apart from the guide element in the guide direction of the slider than without the adapter. In this way, when the adapter is installed, a less extensive ejection path than with the uninstalled adapter is rendered possible. It is also conceivable to implement a kit-like design in the context of the invention. Various adapters can be provided in the kit. Depending on the furniture manufacturer's requirements, the appropriate adapter is selected from the several adapters and installed with the motion arrangement.

As part of this kit idea, the slider can also be directly connected to the guide element in the park position if no adapter is used.

The connection between the guide element and the adapter or the slider is a structural measure that guarantees and always ensures the operational safety of the motion arrangement, because a reliable component assignment is always guaranteed in the park position of the guide element.

The invention thus provides the option of implementing a motion arrangement that can be easily individualized and adapted to the desired application using little assembly effort and few parts.

In the context of the invention, the adapter may be integrally formed or it is conceivable for the adapter to comprise several adapter parts. In particular, the adapter parts can be used to scale the overall length of the adapter in the direction of the adjustment motion of the slider.

According to a preferred design variant of the invention, provision may be made for the detachable connection to be effective between the adapter and the guide element, which detachable connection is formed by at least one first retaining element and an attachment mount. The detachable connection can be used to easily install or uninstall the adapter. The detachable connection defines an unambiguous assignment of the adapter to the guide element, particularly in the park position of the slider. If provision is made for the connection to be detachable in the direction of motion of the adapter, then the slider can entrain the adapter during its adjustment from the park position to the ejection position, wherein in a possible design variant of the invention, the adapter separates from the guide element via the detachable connection.

In the context of the invention, provision may also be made for the detachable connection to be formed in such a way that the first retaining element forms a snap element that engages with a snap mount formed by the retaining mount to form a snap connection and/or for the detachable connection to be formed in such a way that the first retaining element forms a friction element that engages with a friction mount formed by the attachment mount to form a friction-fitting connection. In this way, the detachable connection can be easily joined and/or separated.

A possible variant of the invention may also be such that a connection, preferably a detachable connection, is effective between the adapter and the slider, which connection is formed by at least one second retaining element and a retaining mount, wherein preferably provision may also be made for the connection to be detachable in the direction of motion of the adapter. Again, the components of the motion assembly can be easily installed. If the slider is detachably coupled to the adapter in the direction of motion, the slider can, for instance, detach from the adapter during the adjustment of the slider from the park position to the ejection position and then correspondingly re-couple with the adapter via the detachable connection during the return motion. In this way, a reliably reproducible motion sequence is generated. In the park position, the slider is always reliably assigned to the adapter, safely preventing any malfunctions. In the context of the invention, it is also conceivable that, as mentioned above, there is no detachable connection between the adapter and the slider. Detachable connection shall be understood to denote connections that can be generally loosened, for instance when the motion arrangement is dismantled, but which cannot be loosened in operation when the motion arrangement is used as intended.

These functionalities can be implemented particularly easily if provision is made for the detachable connection to be formed in such a way that the second retaining element forms a snap element that engages with a snap mount formed by the retaining mount to form a snap connection, and/or for the detachable connection to be formed in such a way that the second retaining element forms a friction element that engages with a friction mount formed by the retaining mount to form a friction-fitting connection.

If a non-detachable connection (for instance falling under the above definition) is to be provided, it can be designed in particular in such a way that the adapter is held in a swiveling manner relative to the slider about a swivel axis, which is preferably formed by the at least one second retaining element and the retaining mount, wherein the swivel axis extends transversely with respect to the guide direction of the slider; in this arrangement the slider can be swiveled relative to the adapter, in particular when the slider is swiveled into a tilted-down position in the ejection position and the adapter is not swiveled or is only partially swiveled relative to the slider.

A particularly preferred variant of the invention can be such that the adapter comprises at least one guide piece, which is guided in or on a guide section in or on the housing, preferably linearly. This ensures that even under heavy loads the adapter can interact safely with the guide piece and the slider. The adapter is reproducibly assigned to the guide piece or the slider in every motion position of the motion arrangement via the positive guide of the adapter formed in this way. If, for instance, strong forces act on the motion arrangement, these can be dissipated into the housing via the guide piece of the adapter if the guide is designed accordingly.

Based on such a design, provision may also be made in the context of the invention for the slider to have at least one guide piece, and for the guide piece to be guided in or on the guide section in or on which the guide piece of the adapter is also mounted. This reduces the amount of parts required. In addition, it is also easy to precisely match the motion sequence of the slider and the adapter.

A particularly simple and inexpensive design is achieved for the adapter if provision is made for the adapter to have a connection section between its coupling point with the guide element and the coupling point with the slider, which integrally interconnects the coupling points.

A motion arrangement according to the invention can be such that, in a first mode of use, in which the adapter is installed, the slider can be detachably connected to the guide element in its park position via the adapter, and that, in a second mode of use of the motion arrangement, in which no adapter is installed, the guide element is detachably connected to the slider in the park position of the slider. With both types of use, the slider is therefore securely fixed in its park position, i.e., malfunctions can be ruled out.

A motion arrangement according to the invention can be such that the slider comprises a base part, on which two stops are disposed spaced apart from one another, such that a driver mount is provided between the stops. A driver can be caught in the driver mount to be able to guide the two furniture parts, which can be moved relative to each other, in a permanently coupled manner via the motion arrangement. For instance, the motion arrangement may be mounted to the furniture body and the driver may be installed on the furniture part that is movably attached to the furniture body, or vice versa.

If at least one of the stops is coupled to the base part via a spring element, a malposition of the driver can be easily compensated.

For instance, when the slider is in the park position, the driver must be captured in the driver mount as intended. If the slider is now in its park position and the driver is not caught in the driver mount as intended, this is an incorrect position.

If the driver is now moved in the direction of the slider to bring it into the driver mount, the driver can deflect the stop, which is coupled to the base part via the spring element in a spring-elastic manner. The driver then moves into the driver mount. The spring element then returns this stop to its original position. Then the driver is again accommodated in the driver mount as intended.

Preferably, the spring element is such that the stop can be deflected in the direction of the slider's motion. In this way, the stop can be easily overridden by the driver in the park position, wherein the spring element is deflected.

A variant of the invention may be such that the guide element movably receives a first contact piece, wherein the first contact piece is locked to a guide neck in the park position at a holding section, wherein this locking can be unlocked by applying an overtravel to the guide element, and wherein in the unlocked position the spring element accelerates the guide element towards the ejection position.

The first contact piece can be connected to the guide element to be directly or indirectly movable. The movable connection may comprise or form a swivel bearing and/or a linearly adjustable guide.

The holding section for locking the guide neck can be part of a guide curve for the guide neck. In particular, the holding section can be part of a heart curve of an overtravel mechanism. The holding section can be part of a separate shift module built into the housing, either alone or in conjunction with the guide curve. However, it is also conceivable that the holding section and/or the guide cam is formed integrally with the housing, in particular with a housing part.

Preferably, the locking of the guide neck to the holding section is such that the energy accumulator acting on the guide element preloads the guide neck against the holding section and holds it thereon. To achieve the overtravel position, the guide element can be moved from its holding position on the holding section into the overtravel position against the spring force of the energy accumulator.

In accordance with the invention, provision may also be made for the guide element to movably accommodate a second contact piece, wherein the second contact piece is guided in a return guide at least on a partial path region of the guide element from the park position to the ejection position.

The second contact piece can be connected to the guide element for it to move directly or indirectly. The movable connection may comprise or form a swivel bearing and/or a linearly adjustable guide.

Preferably, the return guide is part of the housing of the motion arrangement, in particular is incorporated in a housing part of the housing.

In particular, the return guide can be part of a recirculating guide, in which the second contact piece is guided in a recirculating manner.

A preferred variant of the invention is such that the return guide is transferred into a longitudinal guide via a first transition section, that an actuator is disposed in the region of the first transition section, which actuator is preferably preloaded by a deflection spring, and which actuator moves the second contact piece from the return guide into the longitudinal guide via the transition section, wherein the actuator is adjusted during the transfer of the second contact piece from the return guide into the longitudinal guide.

The longitudinal guide can be used, for instance, to guide the second contact piece during an adjustment from the ejection position to the park position.

To ensure a safe transition of the second contact piece from the return guide to the longitudinal guide, the actuator is provided which, under the action of the deflection spring, safely moves the second contact piece into the longitudinal guide or holds it therein when the second contact piece is in the ejection position.

In one design variant of the invention, in the ejection position of the slider, the second contact piece may bear against the actuator and/or, in the ejection position of the slider, the actuator in the transition section may block the transition from the longitudinal guide to the return guide in the transition section, at least sectionally, to prevent the second contact piece from passing from the longitudinal guide to the return guide.

According to the invention, provision may also further be made for the longitudinal guide to be transferred into the return guide by means of a second transition section, for an abutment surface to be provided in the region of the second transition section, and for the abutment surface to comprise a surface region, which is preferably disposed in such a way that the second contact piece bears against the surface region in a self-locking shift position, wherein the surface region further preferably extends perpendicularly or substantially perpendicularly to the effective direction of the spring. During the transition from longitudinal guide to return guide, the second contact piece in the second transition section can be guided across the surface region on a path region of its adjustment on the abutment surface and then brought into an intermediate park position. The guide element is moved to an intermediate park position when the slider is adjusted from the eject position towards the park position. For instance, this is in a range of motion, in which the energy accumulator is already partially charged by the kinetic energy of the moving piece of furniture, but the retractor device is not yet effective. The intermediate park position is required to guarantee that the retractor device engages reliably in such an operating position and that the energy accumulator does not unintentionally discharge again and moves the slider into the ejection position. Here, the second contact piece is held to the abutment surface. In the context of the invention provision may also be made for the abutment surface to extend to the direction of action of the spring in such a way that the second contact piece is guided past the abutment surface in order to move it into the intermediate park position. The assignment should be made in such a way that the second contact piece cannot unintentionally slip off the abutment surface due to the action of the energy accumulator.

If, in accordance with the invention, provision is made for the second contact piece to be matched to the abutment surface in such a way that these two motion partners self-lock, this measure also reduces any undesirable noise generation. Owing to the self-locking effect, the second contact piece then has to be pushed over at least part of the region of the second transition section (e.g., by means of the slider) without hitting the intermediate park position hard.

If, in a motion arrangement according to the invention, a detachable connection is provided both between the adapter and the guide element and between the adapter and the slider, then provision may be made for the detachable connection to be formed between the adapter and the guide element to comprise a lower holding force in the direction of motion of the slider from the park position towards the ejection position than the connecting force of the detachable connection between the adapter and the slider. This ensures that, for an adaption from the park position, the adapter first separates from the guide element. This ensures a clearly reproducible motion sequence in favor of low noise emissions.

A motion arrangement according to the invention can also be such that the second contact piece comprises a counter stop, which, in a shift position, bears against a stop of an adjustable securing element, wherein preferably provision is made for the stop to be formed by a surface, which preferably extends in parallel to or essentially in the direction of action of the energy accumulator or which is disposed in such a way that the counter stop is held on the securing element in a self-locking manner.

The mating stop can, for instance, be opposite from the stop of the adjustable securing element, in particular bear against it, in a shift position of the contact piece that corresponds to the aforementioned intermediate park position. As described above, in this intermediate park position the energy accumulator, which preloads the guide element, is partially charged. The fact that the surface forming the stop on the adjustable securing element is disposed in the above-mentioned manner in relation to the effective direction of the energy accumulator prevents the securing element from being unintentionally adjusted via a wedge effect.

Figure 5:
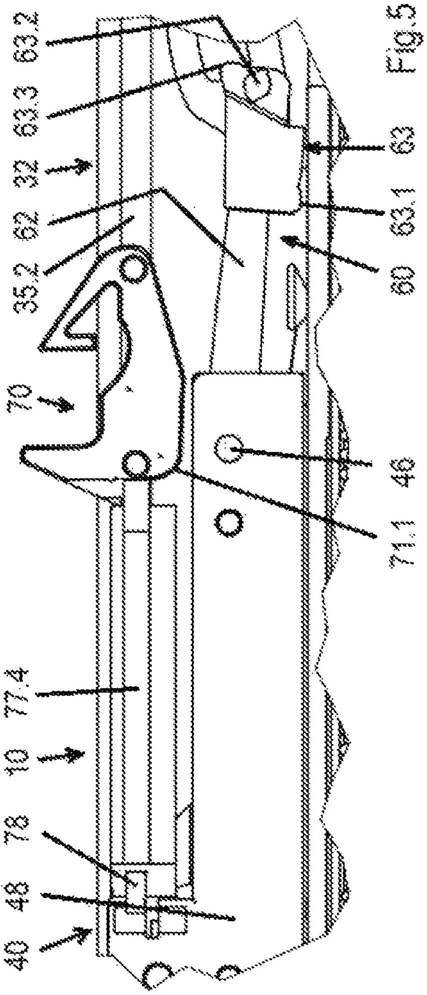
Figure 6:
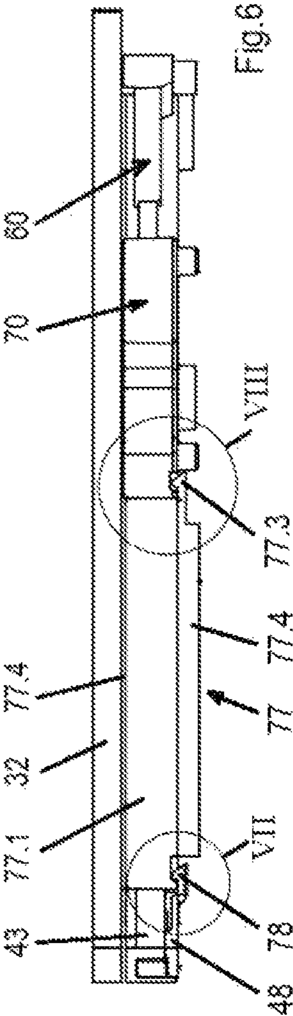
Figure 8:
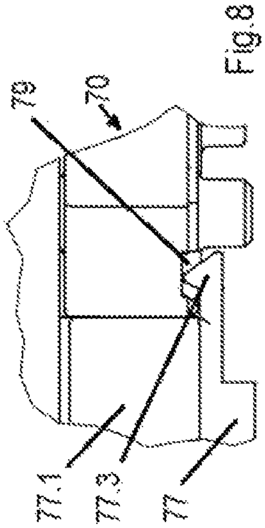
Figure 7:
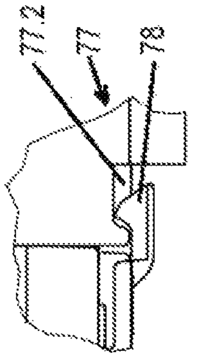
Figure 3:
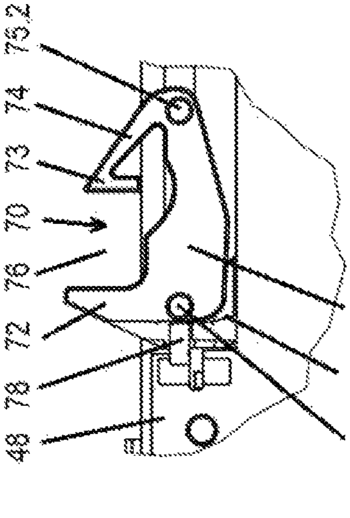
Figure 4:
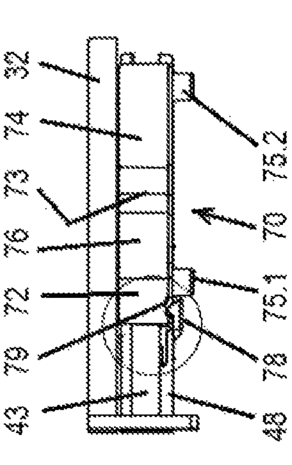
Figure 9:
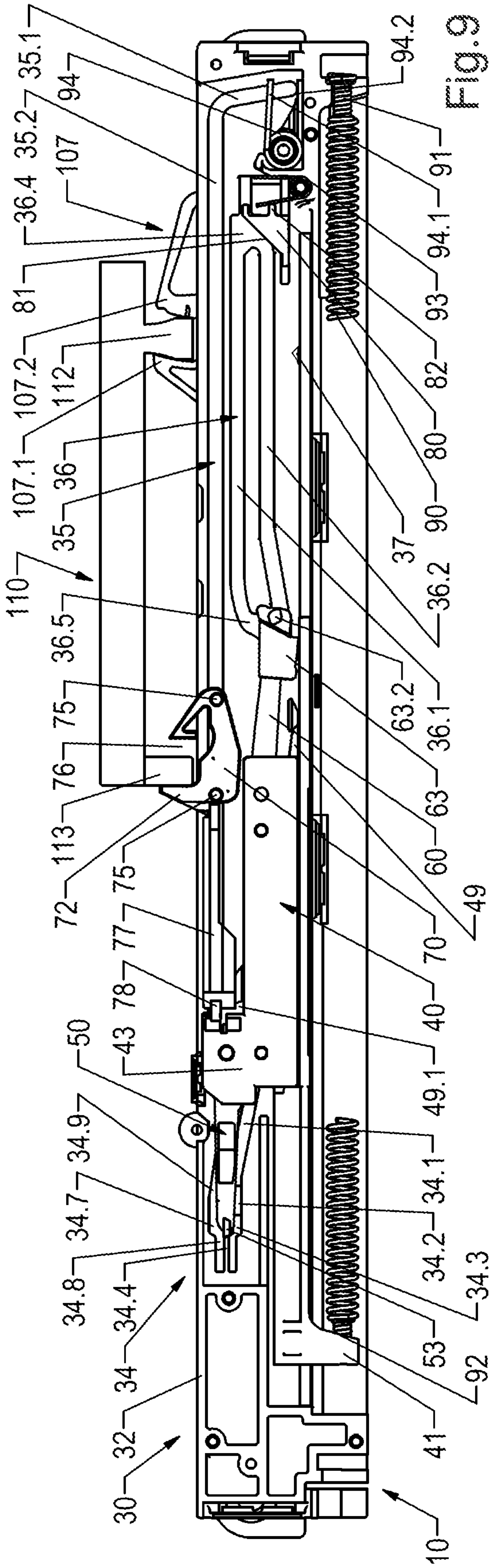
Figure 17:
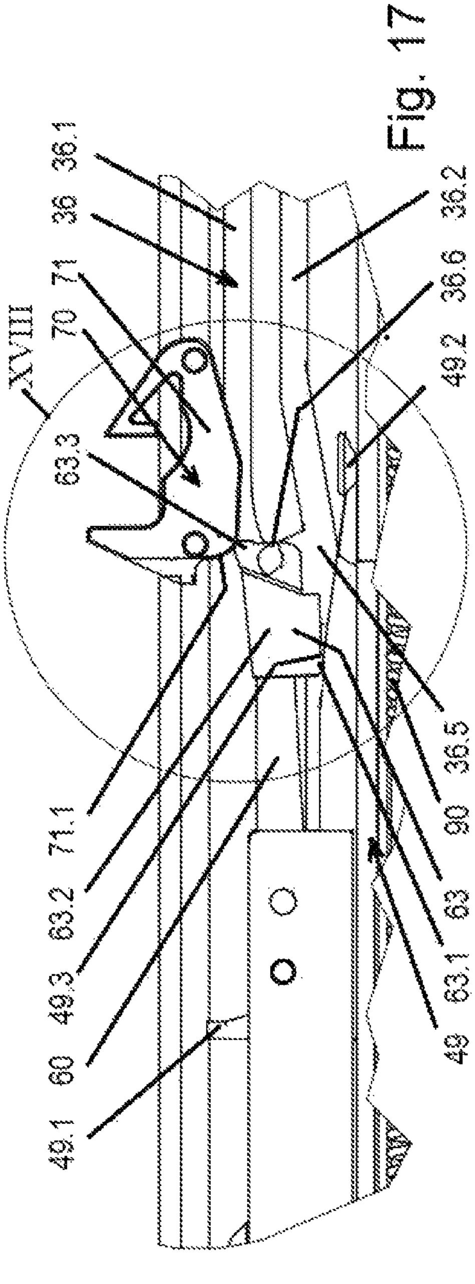
Figure 18:
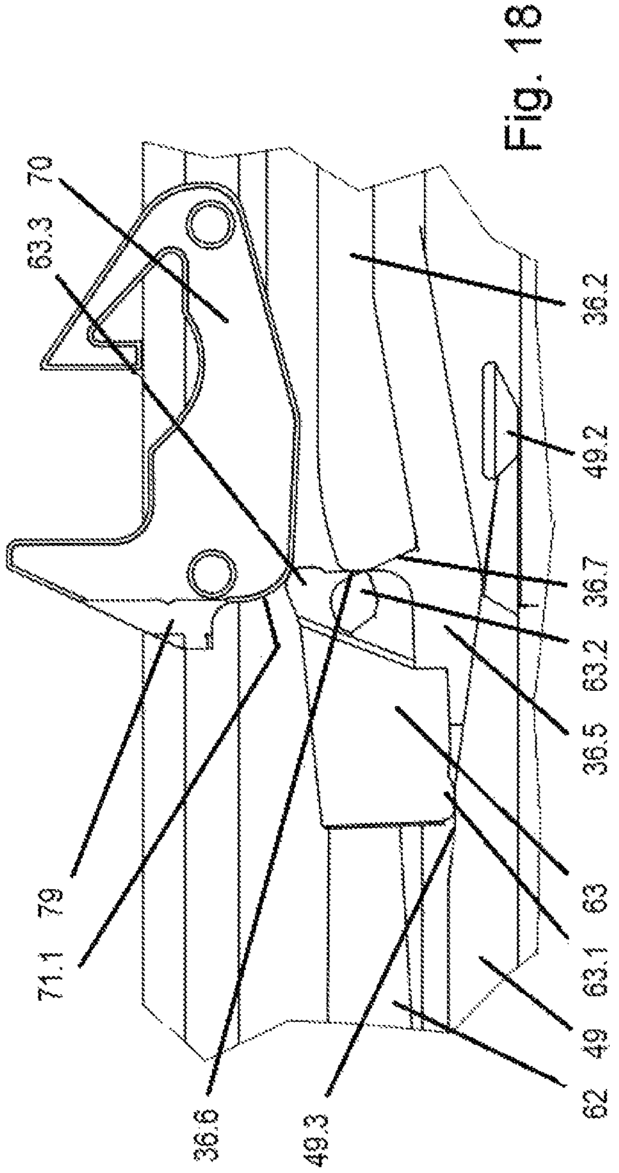
Figure 19:
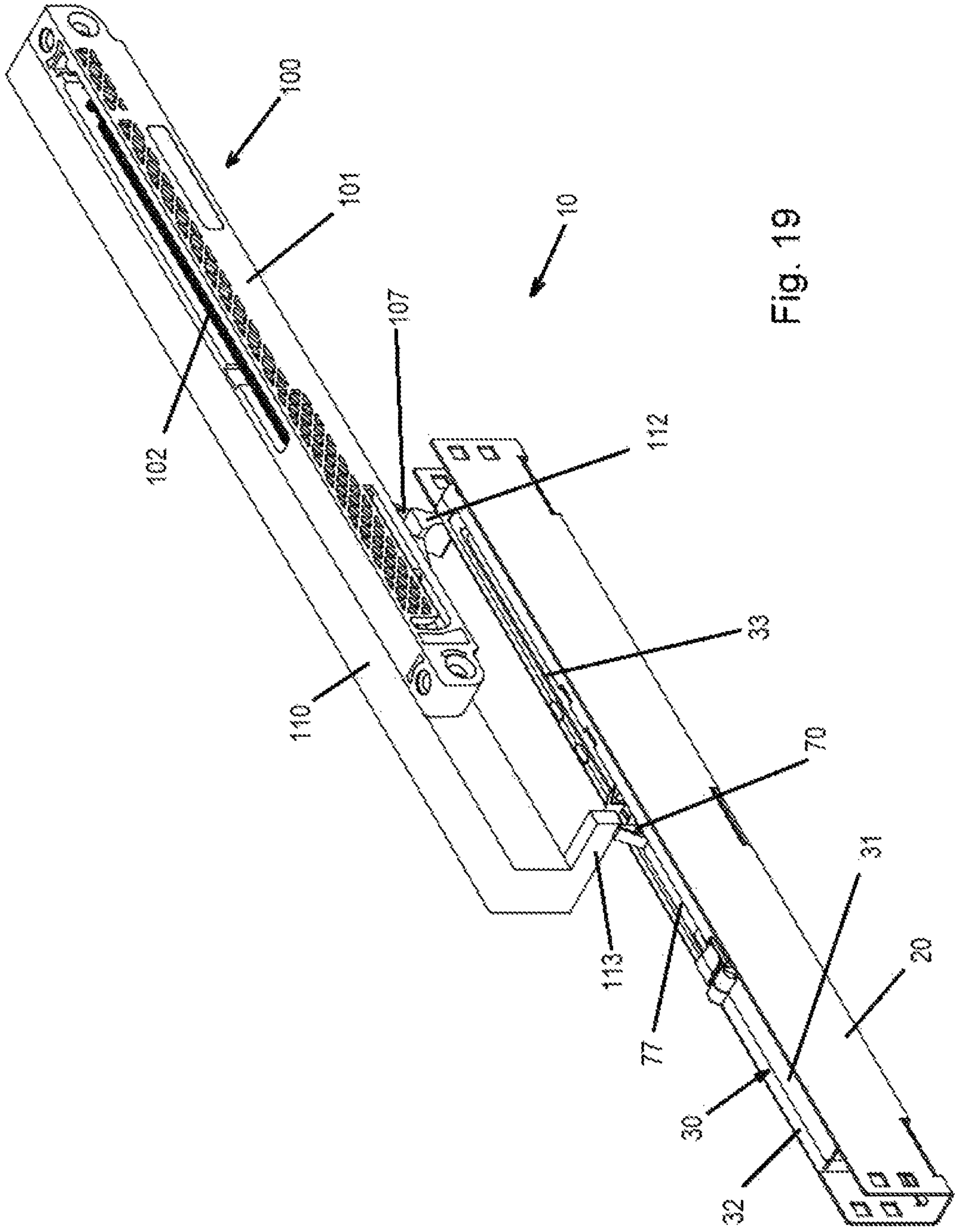

The invention is explained in greater detail below based on exemplary embodiments shown in the drawings. In the figures, FIG. 1 shows a perspective view of a first motion arrangement having a driver, FIG. 2 shows an exploded view of the representation of FIG. 1, FIGS. 3 and 4 show a detail of the motion arrangement according to FIGS. 1 and 2 in a first build, FIG. 5 shows an enlarged view of a detail taken from FIG. 9, FIG. 6 shows a top view of the representation of FIG. 5, FIGS. 7 and 8 show detail designs of the details marked VII and VIII, respectively, in FIG. 6, FIGS. 9 to 16 show various different views and operating positions of the motion arrangement of FIGS. 1 and 2, FIG. 17 shows an enlarged view of a detail taken from FIG. 15, FIG. 18 shows an enlarged view of the detail marked by XVIII in FIG. 17, FIG. 19 shows a perspective view of an alternative embodiment of a motion arrangement according to the invention.

FIG. 1 shows a motion arrangement 10, such as is used for drawers. It is also conceivable to use it for other components to be moved, such as doors, flaps, etc. The motion arrangement 10 comprises a retractor device 100 and a push-out arrangement.

For instance, the retractor device 100 may be disposed on a drawer and the push-out arrangement may be disposed on a furniture body, in which the drawer is housed. Of course, it is also possible to attach the retractor device 100 to the furniture body and the push-out arrangement to the drawer. Furthermore, it is possible to attach the retractor device 100 or the push-out arrangement indirectly to the furniture part, for instance to the guide parts of a pull-out guide that can be moved relative to one another. It is further conceivable to arrange both the retractor device 100 and the push-out arrangement together on a furniture part indirectly or directly, for instance on a drawer or a furniture carcass. It is also conceivable that both units are combined at a uniformly manageable fitting.

Figure 2:
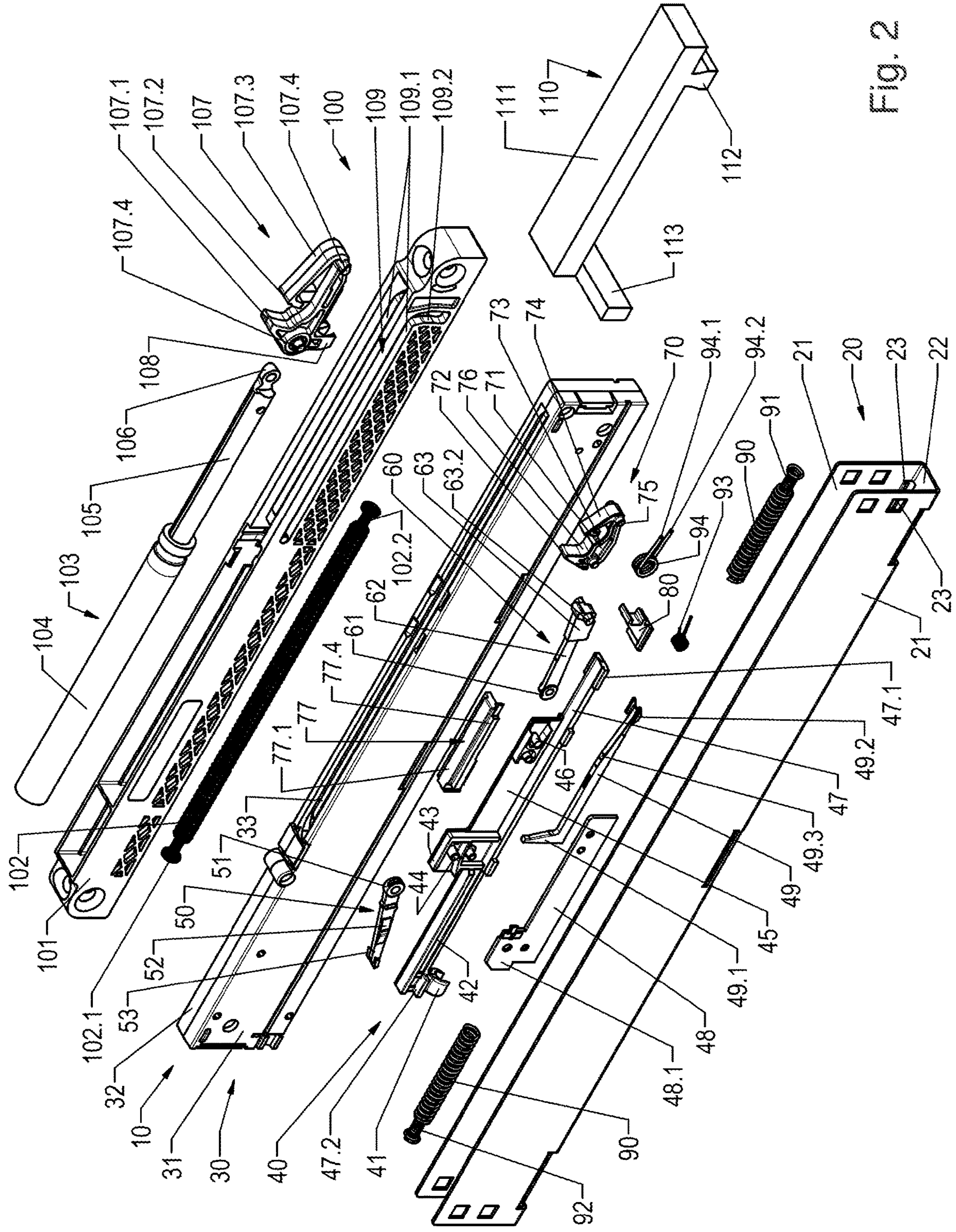

As shown in FIGS. 1 and 2, the retractor device 100 has a housing 101 that supports a mounting piece at each of its longitudinal ends. The fastening pieces can each comprise a screw mount. The screw mounts can be used to attach the retractor device 100 to the individual furniture component, for instance to the drawer.

The housing 101 of the retractor device 100 has two panels spaced apart from and in parallel to each other, in which guides 109 are incorporated. In this case, the guides 109 have a slot-shaped aperture that forms a guide section 109.1. The guide section 109.1 merges into a bend or angled locking section 109.2. The guides 109 of the two walls 14 are interaligned. It is also conceivable to use only one guide 109. However, when two guides 109 are used, a more stable guidance of a coupling element 107 in the guides 109 is achieved.

A damping device 103 is accommodated in the housing 101. The damping device 103 has a damper housing 104, for instance a cylinder, in which a piston is adjustably accommodated. The piston is coupled to a piston rod 105. The piston rod 105 has a connection piece 106 at its longitudinal end.

The damping device 103 may be designed as a fluid damper. For instance, an air damper may be used. Of course, a liquid damper, such as an oil damper, can also be used. The use of an air damper has the advantage that, in the event of damage, no liquid can escape and contaminate the drawer contents.

FIG. 2 shows the damping device 103 in the extended position in. During the return motion from the extension position shown in FIG. 1 to a retraction position, the piston works against an air cushion or an oil volume, wherein an air pressure or an oil pressure is continuously reduced. For this purpose, for instance, there may be at least one small opening in the damper housing 104 and/or in the piston. This allows the compressed air to escape in a controlled manner or the oil pressure to be continuously reduced.

The connector 106, in conjunction with a coupling element 107, forms a swivel bearing. The swivel axis of this swivel bearing extends transversely to the longitudinal extension of the guide section 109.1. For this purpose, the coupling element 107 is equipped with a bearing mount to which the connecting piece 106 of the piston rod 105 can be coupled in a swiveling manner.

The coupling element 107 has a base part. A neck, for instance in the form of a cantilever, extends from the base part. At its end facing away from the base part, the neck is connected to a deflection part via a spring 107.3 in a spring-elastic manner. The deflection part forms a first stop 107.1. A second stop 107.2 is provided on the base part. The two stops 107.1, 107.2 are disposed spaced apart from each other such that a mounting space in the form of a driver mount is formed therebetween.

On opposite ends the coupling element 107 bears guide elements 107.4 on the base part. These guide elements 107.4 are inserted into the two opposing guides 109 such that they are guided therein, preferably linearly, in a displaceable manner. At the same time, these two guide elements 107.4 form a swivel axis about which the coupling element 107 can be swiveled. Further, the coupling element 107 may comprise at least one further guide element 107.4 that protrudes laterally and is spaced apart from the or the first guide element 107.4. This at least one further guide element 107.4 is also inserted into the guide 109 to stabilize the positioning of the coupling element 107. In this exemplary embodiment, the further guide element 107.4 is disposed in the region of the end of the base part that bears the spring 107.3.

It is conceivable that the guide elements 107.4 are not disposed on both ends of the coupling element 107, but they can also be disposed on one end only.

Finally, the coupling element 107 advantageously also has a spring holder 108. A mounting section 102.2 may be used to attach a retractor spring 102 to the spring holder 108. The retractor spring 102 has, opposite from this first attachment section, a second attachment section 102.1. This second attachment section 102.1 attaches the spring 102 to a spring holder of the housing 101.

When in the assembled state, the spring 102, the damping device 103 and the coupling element 107 are housed in the housing 101 of the retractor device 100. It is also conceivable that the spring 102 and/or the damping device 103 are held partially or completely outside the housing 101.

The retractor device 100 can be coupled to the driver 110. The driver 110 has at least one trigger 112, 113, as illustrated in FIG. 2. In this exemplary embodiment, a first trigger 112 and a second trigger 113 are advantageously integrally interconnected via a connection section 111.

The structure of the push-out arrangement of the motion arrangement is explained below in more detail with reference to FIG. 2.

As this illustration shows, the push-out arrangement has a housing 30 having two housing parts 31, 32. The housing 30 has a slot 33 along a dividing plane between the two housing parts 31, 32, which slot is disposed on the upper end of the housing 30 and through which a slider 70 protrudes at least partially from the interior of the housing. The two housing parts 31, 32 can have an elongated shape.

The housing 30 may be made of plastic. A mounting part 20, for instance consisting of a steel sheet blank, may be used to reinforce the housing 30. The mounting part 20 has two mutually spaced apart side panels 21, which are integrally interconnected by a connection section 22. The housing 30 can be set into the mounting part 20 in such a way that the longitudinal ends of the housing 30 bear against the side panels 21 on the inside. The bottom of the housing 30 is supported on the connection section 22. To secure the mounting part 20 to the housing 30, punched-out retaining elements 23, which engage with mounts in the housing 30, can be provided integrally on the side panels 21.

Figure 10:
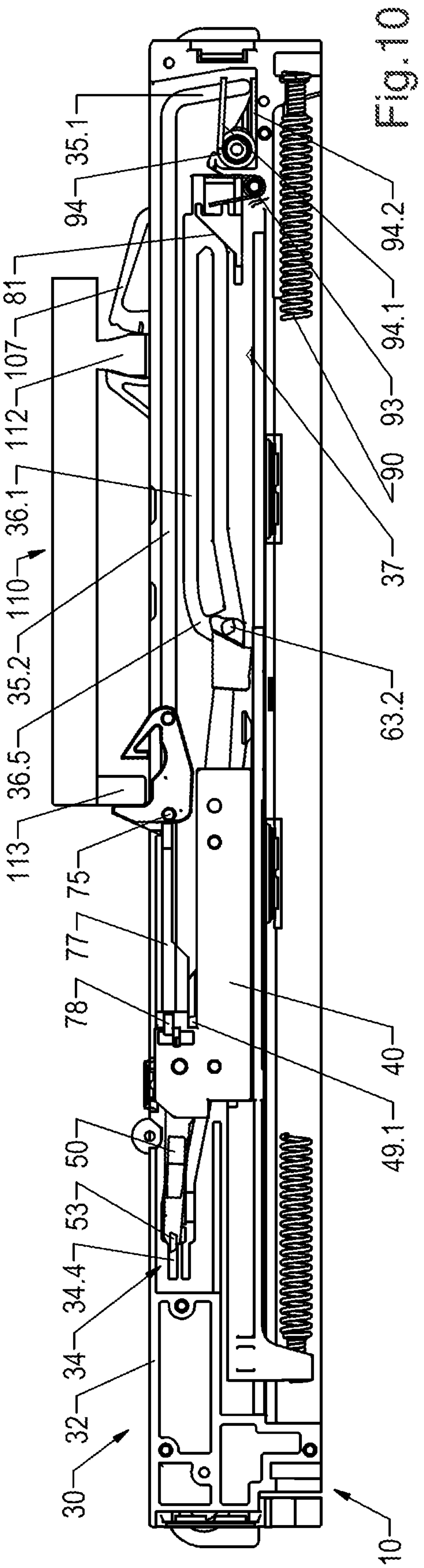
Figure 11:
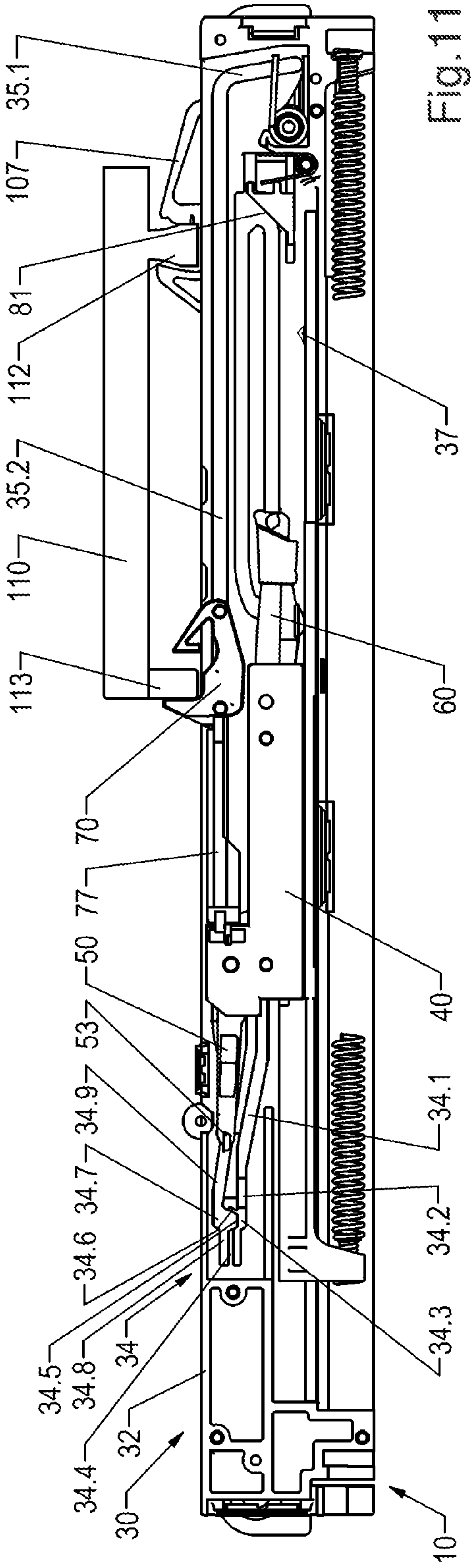

As FIGS. 9, 10 and 11 illustrate, the housing 30 has a shift module 34 formed by both housing parts 31, 32. Alternatively, a separate shift module 34 may be formed and incorporated into the housing 30. It is also conceivable that only one of the housing parts 31, 32 forms the shift module 34.

The shift module 71 has an opening 34.1. Downstream of the opening 34.1, the shift module 34 forms a sliding surface which is transferred into a ramp 34.2. The ramp 34.2 rises up to a guide section 34.3. The guide section 34.3 bears a neck 34.4 that rises from the planar guide section 34.3. In the region of the guide section 34.3 a holding section 34.6 is disposed at a projection. A step 34.5 is disposed between the holding section 34.6 and the neck 34.4. The step 34.5 leads from the guide section 34.3 into the region of a surface section 34.7, which is disposed slightly lower than the guide section 34.3. An overtravel position 34.8 is formed in the region of the cantilever 34.7. The surface section 34.7 is guided around the neck 34.4, which forms the holding section 34.6. In the region of an outlet region 34.9, the surface section 34.7 is transferred to the surface region facing the opening 34.1. In this case, a transition section 34.10 is provided, which returns the outlet region 34.9 to the region forming the opening 34.1. The final guide region 34.11 adjoins the transition section 34.10.

As mentioned above, the shift module 34 may be inserted into the housing part 32 as a separate component. It is also conceivable, as shown in this exemplary embodiment, that the shift module 34 is integrally formed on the housing part 31, which results in fewer parts and less assembly work.

In the assembled state, the open end of the shift module 34 shown in FIG. 11 is covered by the further housing part 32, for the benefit of a low parts cost, such that the interior of the shift module 34 is accessible through the opening 34.1. It is also conceivable that a separate cover is provided to cover the shift module 34.

As FIG. 9 shows, the housing part 31 has a guide 35. The guide 35 may, for instance, have the form of a groove in the housing part 31.

A guide 35 of identical or substantially identical design may be provided on the further housing part 32, wherein the guides 35 face each other when the housing 30 is assembled. The guide 35 has a, preferably linear, guide section 35.2, which transitions into an angled park section 35.1.

The housing 30 may further comprise, for instance in the housing part 31, a guideway 36. The guideway 36 may be formed like a recirculating guide. The guideway 36 can preferably be a groove in the housing part 31. A guideway 36 of identical or substantially identical design may be provided on the further housing part 32, wherein the guideways 36 face each other when the housing 30 is assembled.

The guideway 36 has a longitudinal guide 36.1 and a return guide 36.2 extending in the opposite direction thereto.

The longitudinal guide 36.1 may be transferred to the return guide 36.2 via a first transition section 36.4 and a second transition section 36.5. In this way, a recirculating guide results.

FIGS. 17 and 18 illustrate that the guideway 36 forms an abutment surface 36.6 in the region of the second transition section 36.5. Preferably, the abutment surface 36.6 is planar. Further preferably, the abutment surface 36.6 can extend perpendicularly or substantially perpendicularly to a direction of force of an energy accumulator 90 and/or provision may be made for the abutment surface 36.6 and the guide element 63.2 of the second contact piece 60 to dimensionally match each other in such a way that self-locking results between these two motion partners.

As FIG. 2 shows, a guide element 40 can optionally be installed in the housing 30. This the guide element 40 has a base body 45, which is connected to a connection section 42. The connection section 42 bears a spring holder 41.

As FIG. 2 further illustrates, the guide element 40 may comprise a retaining part 43, preferably on the base body 45. A bearing 44 is formed at the retaining part 43. A first contact piece 50 having a bearing region 51 may be attached to the bearing 44 in a swiveling manner. In FIG. 9, the swivel axis is perpendicular to the image plane. The first contact piece 50 comprises a lever 52, which has a guide neck 53 spaced from the bearing region 51. Advantageously, laterally projecting guide necks 53 are implemented on both ends of the first contact piece 50.

The guide element 40 may also be configured to indirectly or directly support a bearing 46 for a second contact piece 60 on the base body 45.

As shown in FIG. 1, the second contact piece 60 may be configured to be attached to the bearing 46 in a swiveling manner by a bearing region 61. The swivel axis in FIG. 9 can be perpendicular or essentially perpendicular to the image plane. The second contact piece can comprise a lever 62 that bears at least one guide element 63.2 spaced apart from the bearing region 61. In particular, two guide elements 63.2 may be provided on opposite ends, for instance on a head 63, of the second contact piece 60.

The guide element 40 is provided with laterally projecting guide pieces 47.1, 47.2. The guide pieces 47.1, 47.2 preferably project on both ends of the guide element 40. The underside of the guide element 40 may form a guide surface. As FIG. 2 shows, the front guide pieces 47.1 are integrally formed on an extension arm 47, wherein the extension arm 47 may be integrally connected to the base body 45. The extension arm 47 can be used to keep the front guide pieces 47.1 at a wide distance from the rear guide pieces 47.2. This results in a large support distance in support of stable guidance of the guide element 40 in the housing 30.

FIG. 2 further shows that a securing element 49 is provided, wherein the securing element 49 can be adjusted relative to the guide element 40. Preferably, the securing element 49 is guided in a linearly adjustable manner, for instance in or on a guide mount of the guide element 40.

The securing element 49 has an actuating piece 49.1, which is integrally formed in a protruding manner in FIG. 2. At its end facing away from the actuating piece 49.1, the securing element 49 has at least one laterally projecting guide neck 49.2. Preferably, at least one guide neck 49.2 protrudes on both ends of the securing element 49, as FIG. 2 shows. In the transition region between the guide necks 49.2 and the actuating piece 49.1, a stop 49.3 is provided on the securing element 49. This stop 49.3 can preferably be designed as a planar surface.

To install the guide element 40, first the bearing regions 51, 61 of the two contact pieces 50, 60 are installed on the bearings 44, 46 of the guide element 40. The securing of FIG. 49 is inserted into a guide mount of the guide element 40.

A cover 48 can then be connected, preferably snapped, to the guide element 40. A neck 48.1 of the cover 48 covers the retaining part 43 in such a way that the first contact piece is captively secured to the guide element 40. Further, provision may be made for a body region of the cover 48 to cover the region of the bearing 46 such that the second contact piece 60 is also captively retained. Finally, provision may also be made for the cover 48 to retain the securing element 49 in such a way that it is displaceably held in the guide element 40.

The guide piece or pieces 47.1, 47.2 of one end of the guide element 40 can be inserted into a groove of the housing 30, for instance a housing part 31, 32. The lower guide surface of the guide element 40 may additionally rest on an assigned guide surface of the housing 30, if necessary.

In this way, a longitudinal guide is formed, inside which the guide element 40 can be moved in the image plane of FIG. 9. The two opposing guide pieces 47.1, 47.2 visible in FIG. 2 engage with a matching groove of the further housing part 32 when the two housing parts 31, 32 are interconnected. In this way, a secure accommodation of the guide element 40 is guaranteed.

In the assembled state of the guide element 40, the first contact piece 50 of the guide neck 53 engages with the guide of the shift module 34 of the housing part 31. The guide elements 63.2 projecting on both ends of the second contact piece 60 engage with the guideways 36 of the housing parts 30, 31.

The energy accumulator 90 is used to preload the guide element 40. The energy accumulator 90 can be designed as a tension spring, in particular as a helical spring, as in this case. The energy accumulator 90 is secured to a spring holder of the housing 30 by a first connector 91, as shown in FIG. 9. The energy accumulator 90 has a second connector 92 opposite from the first connector 91. This second connector 92 is attached to the spring holder 41 of the guide element 40.

The guide pieces 103.4 projecting on both ends of the securing element 49 can be guided on guides of the housing parts 31, 32, in favor of a stable sliding guide.

As FIG. 2 further shows, the slider 70 can be installed in the housing 30. The slider 70 has a base part 71. As FIG. 3 shows, the slider 70 has two stops 72.73, which are spaced apart from each other. A driver mount 76 is formed in the region of the stops 72.73. The design of the slider 70 may, for instance, be such that at least one of the stops 72, 73, in this exemplary embodiment the stop 73, is coupled to the base part 71 by means of a spring element 74. The slider 70 has guide pieces 75.1, 75.2 on both ends. Two guide pieces 75.1, 75.2 may be provided on each end of the slider 70.

FIG. 3 further shows that the slider 70 comprises a deflection contour 71.1, which is preferably convex.

FIG. 4 illustrates that the slider 70 comprises a retaining mount 79. This can, for instance, be designed as a snap mount. This retaining mount 79 is configured and intended to interact with a first retaining mount 78 of the guide element 40.

As FIGS. 3 and 4 show, in a parked position of the slider 70, the first retaining element 78 can interact with the retaining mount 79 in such a way that a detachable connection is established between the guide element 40 and the slider 70. In particular, this detachable connection is designed to be detachable and rejoinable in the direction of the adjustment motion of the slider 70, for instance in the direction of the longitudinal extension of the guide section 35.2.

The configuration shown in FIGS. 3 and 4 illustrates a first design variant of the push-out arrangement.

FIGS. 1, 2, and 5 to 19 show a second design variant of the push-out arrangement. An adapter 77 is used for this purpose. The design of the adapter 77 can be seen in FIG. 1. As this illustration shows, the adapter 77 has a connection section 77.1. An attachment mount 77.2 is disposed at one end of the connection section 77.1 and a second retaining element 77.3 is disposed at the opposite end, as clearly shown in FIGS. 5 to 8. Furthermore, the adapter 77 preferably has guide pieces 77.4 on opposite ends, for instance protruding necks or molded-in guide mounts, which can also be seen in FIGS. 5 to 8. These guide pieces 77.4 are inserted into the guide sections 35.2 of the guides 35 of the two housing parts 31, 32 to form a longitudinal guide.

FIGS. 5 to 8 show a park position of the slider 70. In this park position, the slider 70 is detachably connected to the adapter 77 by means of its snap mount 79 (FIG. 8). Accordingly, the second retaining element of the adapter 77 is locked, in particular snapped, in the retaining mount 79.

Furthermore, in the park position of the slider 70, the adapter 77 is detachably connected to the guide element 40. For this purpose, the first retaining element 78 engages with the attachment mount 77.2 of the adapter 77, and is preferably snapped in place there (see FIG. 7).

The adapter 77 is configured to comprise a mounting region configured to rest against the actuating piece 49.1 of the securing element 49. Preferably, this mounting region may be integrally formed as a recessed mount in the adapter 77.

FIG. 1 further shows that an actuator 80 may be mounted inside the housing. The actuator 80 can be mounted in a guide of the housing 30 in a linearly adjustable manner. As FIG. 9 shows, the actuator 80 can be held in the housing 30 against the preload of a spring 93. The spring 93 can, for instance, be designed as a torsion spring with two spring legs that can be adjusted relative to one another. An actuating piece 82 of the actuator 80 rests against the spring 93, for instance against a spring leg, to be held in a pretensioned state by the spring 93. The second end of the spring 93, for instance the second leg may be supported relative to the housing 30.

The actuator 80 has a ramp 81, which runs obliquely to the guide direction of the return guide 36.2.

FIGS. 9 and 10 further show that a deflection spring 94 is disposed inside the housing 30. The deflection spring 94 has two spring ends, in particular two spring legs 94.1, 94.2, wherein the spring ends can be adjusted relative to one another. One spring end (spring leg 94.2) is supported against the housing 30 and the other spring end (spring leg 94.1) is designed to support the slider 70 in an ejection position in a spring-elastic manner (see FIG. 13).

The function of the motion arrangement is explained in more detail below, with reference to FIGS. 3 to 18.

FIG. 9 shows the position in which the movable furniture part is in a retracted position, for instance, a drawer in the closed position. In this position, the slider 70 is in its park position. The guide neck 53 of the first contact piece 50 is locked to the holding section 34.6. The adapter 77 is locked to the guide element 40 and the slider 70 is locked to the adapter 77. The guide element 63.2 of the second contact piece 60 is disposed in the return guide 36.2. The guide element 40 is under the preload of the energy accumulator 90.

In the park position, the second trigger 113 is mounted in the driver mount 76 of the slide 70. The first trigger 112 is located in the mount formed between the two stops 107.1, 107.2. The retractor spring 102 of the retractor device 100 is in an unloaded position and still has a residual tension to keep the coupling element 107 preloaded, thus keeping the movable furniture part in the closed position.

When an overtravel is now applied to the slider 70, the second trigger 113 presses against the stop 72 such that the slider 70 performs an overtravel, in FIG. 9 from right to left. As shown in FIG. 10, the guide neck 53 disengages from the holding section 34.6 and reaches the overtravel position 34.8 as shown in FIG. 10. In the motion from FIG. 9 to FIG. 10, the guide element 40 is moved against the preload of the energy accumulator 90 for this purpose.

If the driver 110 is now relieved of load, the energy accumulator 90 can release its spring energy. As FIG. 11 shows, the guide element 40 is moved in a guided manner, from left to right in the image plane of FIG. 11.

By adjusting the guide element 40, the guide neck 53 of the first contact piece 50 is adjusted in the outlet region 34.9 of the shift module 34. The guide element 40 pushes the slider 70 over the adapter 77 and entrains it in that way. The sliding motion of the slider 70 is transmitted to the driver 110. The coupling element 107 is adjusted via the coupling of the two triggers 113, 112. Because the spring force of the energy accumulator 90 is greater than the force of the retractor spring 102, the retractor spring 102 is tensioned and charged by means of the energy accumulator 90.

In so doing, the guide elements 107.4 of the coupling element 107 are adjusted in the linear guide section 109.1 of the guide 109.

As soon as the coupling element 107 with its two guide elements 107.4 at the front in the direction of motion, which may be disposed in the region of the spring 107.3, enters the angled or bent region of the guide 109 formed by the guide sections 109.2, the coupling element 107 tilts. The swivel axis about which the coupling element 107 tilts is formed by the two rear guide elements 107.4.

In the tilted state, the coupling element 107 (see, for instance, FIGS. 12 to 13) releases the first trigger 112 of the driver 110. The retractor spring 102 is fully tensioned in the tilted position of the coupling element 107. Further, as the coupling element moved toward the tilted position, the piston rod 105 was extended.

During its motion, the guide element 40 entrains the first contact piece 50, wherein the latter is guided in the shift module 34 through the outlet region 34.9 and moved to the transition section 34.10. From there, the guide neck 53 enters the guide region 34.11.

Figure 12:
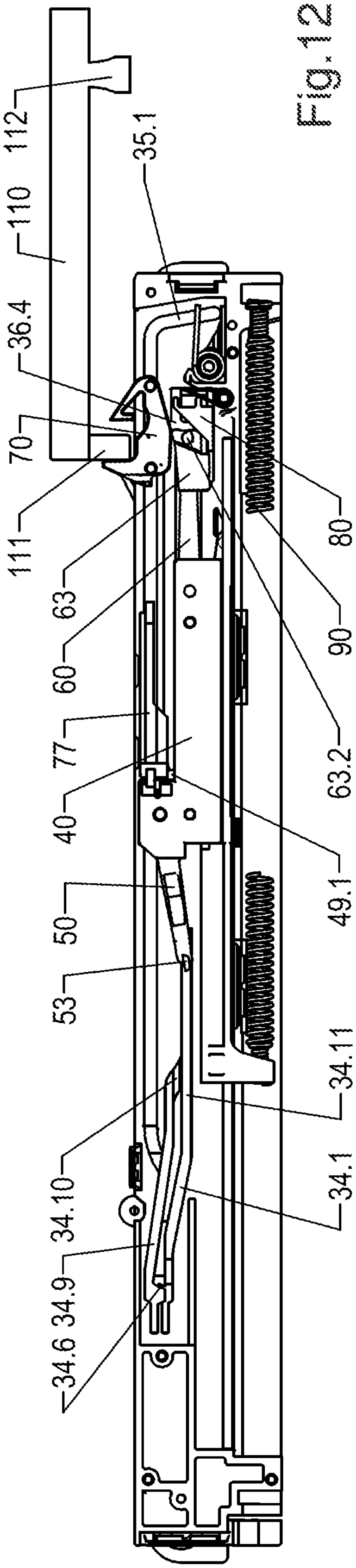

The guide element 40 moves the guide element 63.2 of the second contact piece 60 in the return guide 36.2 until the second contact piece 60 hits the actuator 80 (see sequence of figures of FIGS. 11 and 12). The energy accumulator 90 pulls the second contact piece 60 of the guide element 40 against the actuator 80. The actuator 80 is then displaced against the preload of the spring 93 (see FIG. 12). At the same time, the second contact piece 60 slides, for instance with its head 63, on the ramp 81 of the actuator 80 until it reaches the region of the longitudinal guide 36.1. In this operating position according to FIG. 13, the guide element 40 is preferably held against a stop, wherein the spring 90 pulls the guide element 40 against a stop of the housing 30 and holds it there.

As FIG. 12 shows, the adapter 77 detaches from the guide element 40. For this purpose, the detachable connection between the adapter 77 and the guide element 40 is loosened by the kinetic energy acting on the slider 70. Then the slider 77 moves relative to the guide element 40 in freewheeling.

Figure 13:
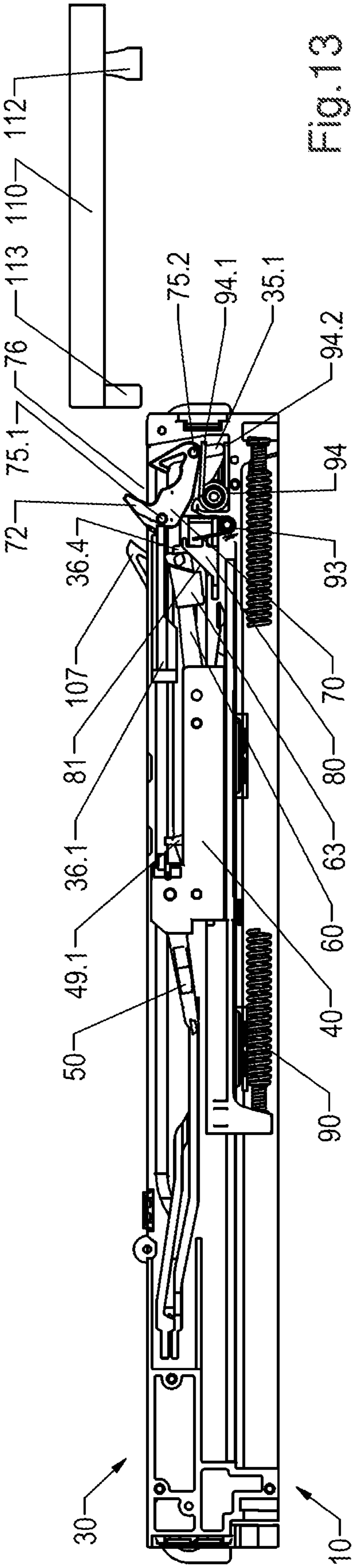

When the slider 70 has traveled across the second contact piece 63, the actuator 80 pushes the head 63 of the second contact piece 60 from the return guide 36.2 through the first transition section 36.4 into the region of the longitudinal guides 36.1, as shown in FIG. 13. The spring 93 pushes the actuator 80 back to its original position, which is preferably limited by a stop of the housing, which abuts against the actuator 80.

As FIG. 13 shows, the slider 70 was moved to a tilted position. To achieve this tilted position, the guide pieces 75.2 of the slider 70 are retracted into the park section 35.1 of the guide 35. The guide pieces 75.1 are disposed in the longitudinal guide 36.1. The swivel axis about which the slider 70 tilts is formed by the two guide pieces 75.1.

To be able to safely reach the tilted position, provision may preferably be made for the detachable connection between the slider 70 and the adapter 77 to be designed in such a way that a swivel adjustment between the slider 70 and the adapter 77 is possible.

FIG. 13 shows that the slider 70 is supported in its tilted position relative to the deflection spring 94. In this case, the slider 70 can be moved beyond the ejection position shown in FIG. 13 into a further tilted position relative to the ejection position against the pretension of the deflection spring 94. This is to protect the ejector from damage if there is a misalignment of the second trigger 113 with respect to the slide 70. If, contrary to the illustration of FIG. 13, the second trigger 113 is not in its intended position, but is to the left of the slider 70 in FIG. 13, then the second trigger 113 can overrun the slider 70. When the second trigger part 113 is moved from left to right, the second trigger 113 hits the stop 72. Because the stop 72 is spaced apart from the swivel axis of the slider 70, a tilting moment is results, which moves the slider 70 beyond the ejection position shown in FIG. 13 into a deflection position against the preload of the deflection spring 94. Then the second trigger 113 can overrun the slider 70. It thus reaches its intended position.

In FIG. 13, the driver 110 is decoupled from the motion assembly and is in freewheeling mode. The energy storage device 90 has introduced a kinetic energy into the second trigger 113, which can now be used to automatically adjust the two furniture parts that can be adjusted relative to one another, for instance to move the drawer to an open or partially open position.

Figure 14:
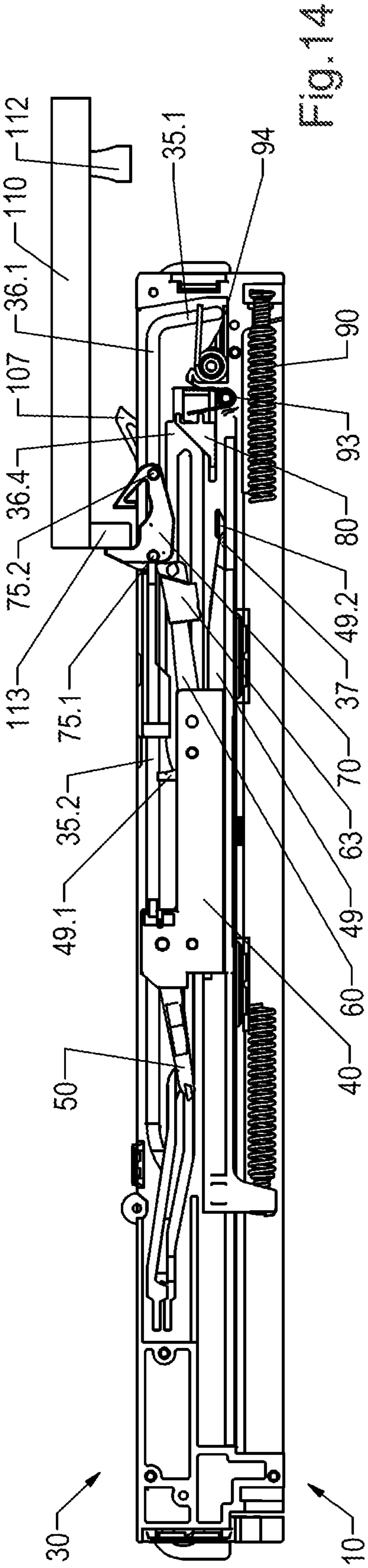
Figure 15:
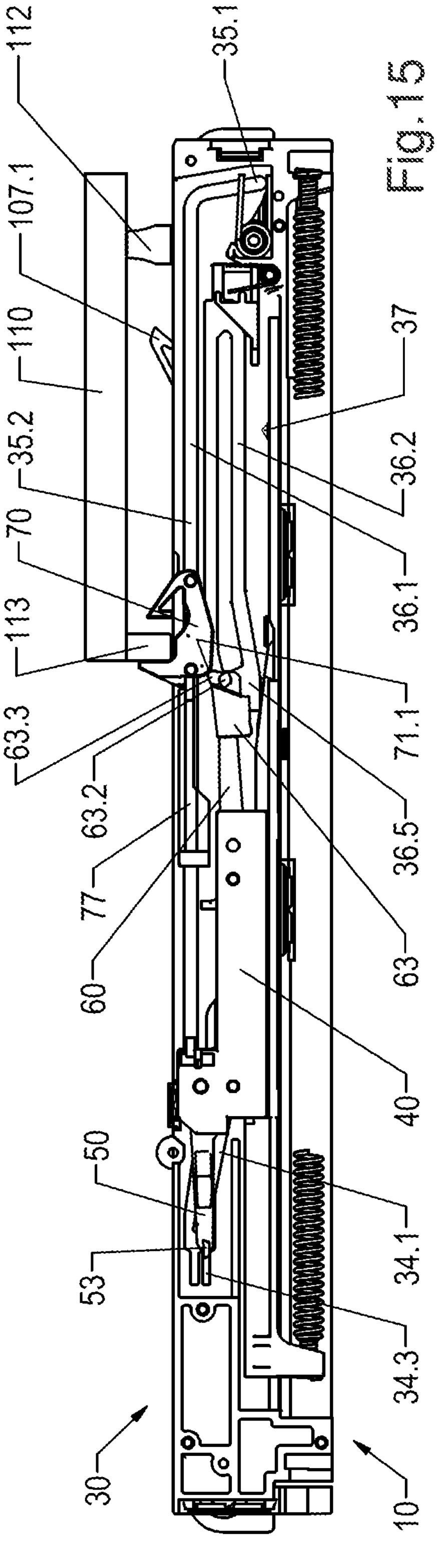
Figure 16:
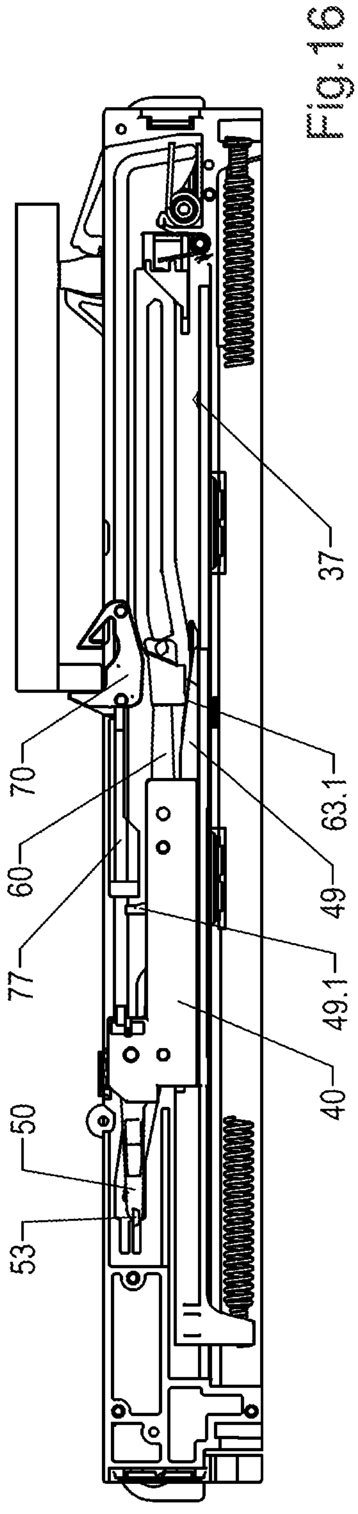

In the sequence of figures shown in FIGS. 14 to 16, it is now shown how the drawer can be moved from an open position to a closed position.

In closing the drawer, the second trigger 113 hits the stop 72. In this way, a force is applied to the slider 70 that is eccentric to the swivel axis of the slider 70. The slider is then disengaged from the tilted position shown in FIG. 13 and moved to the position shown in FIG. 14. In the process, the guide pieces 75.2 of the slider 70 again enter the region of the longitudinal guide 36.1.

A body contour of the slider 70 hits the second contact piece 60 and entrains the second contact piece when the drawer is closed. In this way, the guide element 40 is also adjusted and thus the energy accumulator 90 is tensioned.

When the slide 70 is moved from the eject position (FIG. 13) towards the park position, the first contact piece 50 is also moved towards the opening 34.1 of the shift module 34.

When the slider 70 is moved from the eject position towards the park position, the securing element 49 hits a locking piece 37 at the housing, which can be seen in FIG. 11, for instance. FIG. 14 shows the moment when the locking piece 37 is held by the securing element 49. In the process, the guide neck 49.2 hits the locking piece. Thus, the securing element 49 is held at the locking piece while the guide element 40 continues to move. In other words, the securing element 49 is adjusted relative to the guide element 40 and brought into an extended position. Accordingly, the actuating piece 49.1 of the securing element 49 moves, as can be seen in the transition from FIG. 13 to FIG. 14.

As can be taken from FIG. 15, the first trigger 112 hits the coupling element 107 when the movable furniture parts are increasingly moved relative to one another. In particular, the first trigger 112 applies a force to the stop 107.1 that is eccentric to the swivel axis of the coupling element. In this way the coupling element 107 is moved out of its tilted position and into a position in which all guide elements 107.4 of the coupling element 107 reach the region of the guide section 109.1. Now the retractor spring 102 can unload and release its spring force. This spring force is introduced into the second trigger 113 via the first trigger 112, such that the closing motion of the furniture parts movable relative to one another is supported. In addition, the kinetic energy of the furniture parts displaced against each other is effective. In this way, the furniture parts that move relative to one another are moved to their closed position. At the same time, the damping device 103 acts and brakes the closing motion rendering low-noise or noise-free closing possible.

As FIG. 15 shows, the guide element 63.2 of the second contact piece 60 is moved in the longitudinal guide 36.1 up to the second transition section 36.5. The slider 70 has a deflection contour 71.1. This deflection contour 71.1 slides along a deflection piece 63.3 of the second contact piece 60, thereby pressing the second contact piece 60 into the region of the second transition section 36.5. This process is shown in more detail in FIGS. 17 and 18.

These illustrations also show that an abutment surface 36.6 is disposed in the region of the second transition section 36.5. Advantageously, the abutment surface is aligned perpendicularly or essentially perpendicularly to the direction of the spring force of the energy accumulator 90 and/or provision is made for the abutment surface 36.6 to be dimensionally matched to the guide element 63.2 in such a way that self-locking can be implemented between these two motion partners.

This the abutment surface 36.6 adjoins a guide bevel 36.7. In this way, the guide element 63.2 of the second contact piece can first be guided along the abutment surface 36.6 with low noise and then be reliably temporarily parked on the abutment surface 36.6 in the region of the guide bevels 36.7 without fear that the second contact piece 60 will unintentionally swing out upward from the temporary park position when the slider 70 has passed over the head 63. If, as mentioned above, self-locking is implemented, the guide element 63.2 must be pushed past the abutment surface 36.6 until it reaches the region of the guide bevels 36.7. The abutment surface 36.6 thus prevents the second contact piece from traveling uncontrollably along a partial range of motion and impacting hard in the intermediate park position. In this way, a noise reduction is achieved.

FIG. 18 further shows that, according to a variant of the invention, the second contact piece 60 comprises, preferably in the region of the head 63, a counter stop 63.1, which bears against the stop 49.3 of the securing element 49 when the second contact piece 60 is in the intermediate park position.

Advantageously, the stop 49.3 is formed as a surface, preferably this surface extends in such a way that the counter stop 63.1 is held on the stop 49.3 in a self-locking manner, wherein preferably provision may be made for the stop 49.3 to extend in parallel or essentially in parallel to the direction of force of the energy accumulator 90. Accordingly, such a force is prevented from being introduced into the securing element 49 from the energy accumulator 90 via the guide element 40 into the second contact piece 60 such that an unintentional adjustment of the securing element 49 is caused or that an excessive force would be required to adjust the secured securing element 49.

When the slider 70 in FIG. 18 has traveled over the second contact piece (see FIG. 16), the guide element 40 is in an overtravel position, in which the guide neck 53 of the first contact piece 50 is located in the region of the guide section 34.3 of the shift module 34. As explained above with reference to FIG. 18, the guide element 40 is then not locked to the holding section 34.6 of the shift module 34, but is nevertheless securely supported on the guide bevel 36.7 and in the housing 30 on the securing element 49, precluding a malfunction.

In the further motion sequence, the adapter 77, which is coupled to the slider 70, hits the actuating piece 49.1 of the securing element 49 (see FIG. 16). As a result, during the further closing motion, the actuating piece 49.1 and with it the securing element 49 are displaced from right to left in the image plane of FIG. 16. In so doing, the securing element 49 is continuously pulled away from the counter stop 63.1 of the second contact piece 60. This releases the second contact piece 60 and it slides along the guide bevel 36.7 (see FIG. 18) supported by the force of the spring 90 into the region of the return guide 36.2. Pulling off the securing element 49 does not cause any disturbing shift noises.

When the securing element 49 is pulled away from the second contact piece 60, the energy storage device 60 moves the first contact piece 50 from left to right in the image plane of FIG. 16. The guide neck 53 then engages with the holding section 34.6 of the shift module 34. Accordingly, the starting position as shown in FIG. 9 is reached again. Accordingly, the adapter 77 is again locked to the guide element 40 and to the slider 70.

If a longer ejection path is now required by the ejection arrangement, this can be easily achieved by uninstalling the adapter 77. Accordingly, the slider 70 then locks directly with the guide element 40 in the park position (see FIGS. 3 and 4). In all other respects, the operation of the extension device remains unchanged.

FIG. 19 shows an alternative design variant of the invention. In that case, the ejection device is designed identically to the ejection device of FIGS. 1 to 18.

In the variant of the embodiment of FIG. 1, the retractor device 100 in conjunction with the ejection device can be assigned to a first furniture part. The driver 110 is then assigned to the second piece of furniture that is to be moved relative to this first piece of furniture.

In the variant of the embodiment of FIG. 19, the ejector device is assigned to one furniture part and the retractor device 100 to the other furniture part. To this end, the driver 110 is assigned to, for instance, the furniture part that supports the retractor device 100. Advantageously, the driver 110 may be connected to the retractor device 100.

In accordance with the invention, the exemplary embodiments illustrated in the drawings show motion arrangements 10, in particular for a drawer, sliding doors, hinged doors, flaps or similar movable furniture parts, having a push-out arrangement, wherein the push-out arrangement comprises the guide element 40. The energy accumulator 90 acts on the guide element 40. The guide element 40 is guided in the housing 30 and can be adjusted from a park position to an ejection position by means of the energy accumulator 90. At least along part of its travel path from the park position to the ejection position, the guide element 40 entrains the slider 70. In this case, the guide element 40 moves the slider over the adapter 77, wherein the adapter 77 is designed as a separate component.

The invention claimed is:

1. A motion arrangement for a movable furniture part, comprising:

a housing;

a push-out arrangement including a guide element;

an energy accumulator guided on or in the housing and configured to displace the guide element relative to the housing along a travel path from a park position to an ejecting position;

a slider arranged to be entrained by the guide element along at least part of the travel path, and the slider being arranged such that the slider can be swiveled into a tilted position;

at least one adapter;

wherein the guide element is connected to the slider in the park position directly or indirectly by a first detachable connection; and wherein the guide element, the adapter and the slider are configured such that in a first mode of use in which the adapter is installed, the slider can be detachably connected to the guide element indirectly by the adapter, and in a second mode of use in which no adapter is installed, the guide element can be detachably connected directly to the slider.

2. The motion arrangement of claim 1, wherein:

in the first mode of use the first detachable connection is formed between the guide element and the adapter by at least one first retaining element and an attachment mount, such that the first detachable connection is detachable in a direction of motion of the adapter along the travel path.

3. The motion arrangement of claim 2, wherein:

in the first mode of use the first retaining element forms a snap element and the attachment mount forms a snap mount, such that the snap element and the snap mount form a snap connection.

4. The motion arrangement of claim 2, wherein:

in the first mode of use a second detachable connection is formed between the adapter and the slider by at least one second retaining element and a retaining mount, such that the second detachable connection is detachable in a direction of motion of the adapter along the travel path.

5. The motion arrangement of claim 4, wherein:

in the first mode of use the second retaining element forms a snap element and the retaining mount forms a snap mount, such that the snap element and the snap mount form a snap connection.

6. The motion arrangement of claim 4, wherein:

in the first mode of use the first detachable connection between the guide element and the adapter has a lower holding force in the direction of the travel path from the park position towards the ejecting position than a holding force of the second detachable connection between the adapter and the slider in the direction of the travel path from the park position towards the ejecting position.

7. The motion arrangement of claim 1, wherein:

in the first mode of use the adapter is connected to the slider in a swiveling manner about a swivel axis extending transversely to the travel path.

8. The motion arrangement of claim 1, wherein:

in the first mode of use the adapter includes at least one guide piece guided linearly on a guide section in or on the housing.

9. The motion arrangement of claim 8, wherein:

in the first mode of use the slider includes at least one further guide piece guided in or on the guide section in or on which the guide piece of the adapter is also guided.

10. The motion arrangement of claim 1, wherein:

in the first mode of use the adapter includes a first connection point connected to the guide element and a second connection point connected to the slider, and the adapter includes a connection section integrally interconnecting the first and second connection points.

11. The motion arrangement of claim 1, wherein:

the slider includes a base part and two stops disposed on the base part and spaced apart from one another to provide a driver mount between the two stops, wherein at least one of the stops is coupled to the base part by a spring element.

12. The motion arrangement of claim 1, further comprising:

a first contact piece connected to the guide element, the first contact piece including a guide neck;

wherein the housing includes a holding section; and wherein in the park position the guide neck is in a locked position locked to the holding section;

wherein the locked position can be unlocked by applying an overtravel to the guide element; and wherein the spring element is configured to accelerate the guide element towards the ejecting position when the locked position is unlocked.

13. The motion arrangement of claim 12, further comprising:

a second contact piece connected to the guide element; and wherein the housing further includes a return guide and the second contact piece is guided along the return guide along at least a portion of the travel path from the park position towards the ejecting position.

14. The motion arrangement of claim 13, wherein:

the housing further includes a longitudinal guide and a first transition section communicating the return guide and the longitudinal guide; and further including an actuator disposed in the first transition section, and a deflection spring preloading the actuator such that the actuator moves the second contact piece from the return guide into the longitudinal guide via the first transition section.

15. The motion arrangement of claim 14, wherein:

the housing further includes a second transition section communicating the return guide and the longitudinal guide, the second transition section including an abutment surface disposed such that the second contact piece bears against the abutment surface in a self-locking shift position.

16. The motion arrangement of claim 15, further comprising:

an adjustable securing element including a stop; and wherein the second contact piece includes a counter stop configured such that in the self-locking shift position, the counter stop bears against the stop of the adjustable securing element in a self-locking manner.

17. The motion arrangement of claim 1, further comprising:

a pull-in device, wherein the push-out arrangement and the pull-in device are combined on a single component of the motion arrangement.

18. The motion arrangement of claim 1, further comprising:

a pull-in device, wherein one of the push-out arrangement and the pull-in device is configured to be mounted on the movable furniture part and the other of the push-out arrangement and the pull-in device is configured to be mounted on another furniture part; and a driver configured to be connected to the pull-in device.

* * * * *